Dec. 4, 1962　　　L. KUNZMANN　　　3,066,475
ELASTIC LINK STRAPS
Filed Nov. 15, 1956　　　4 Sheets-Sheet 1
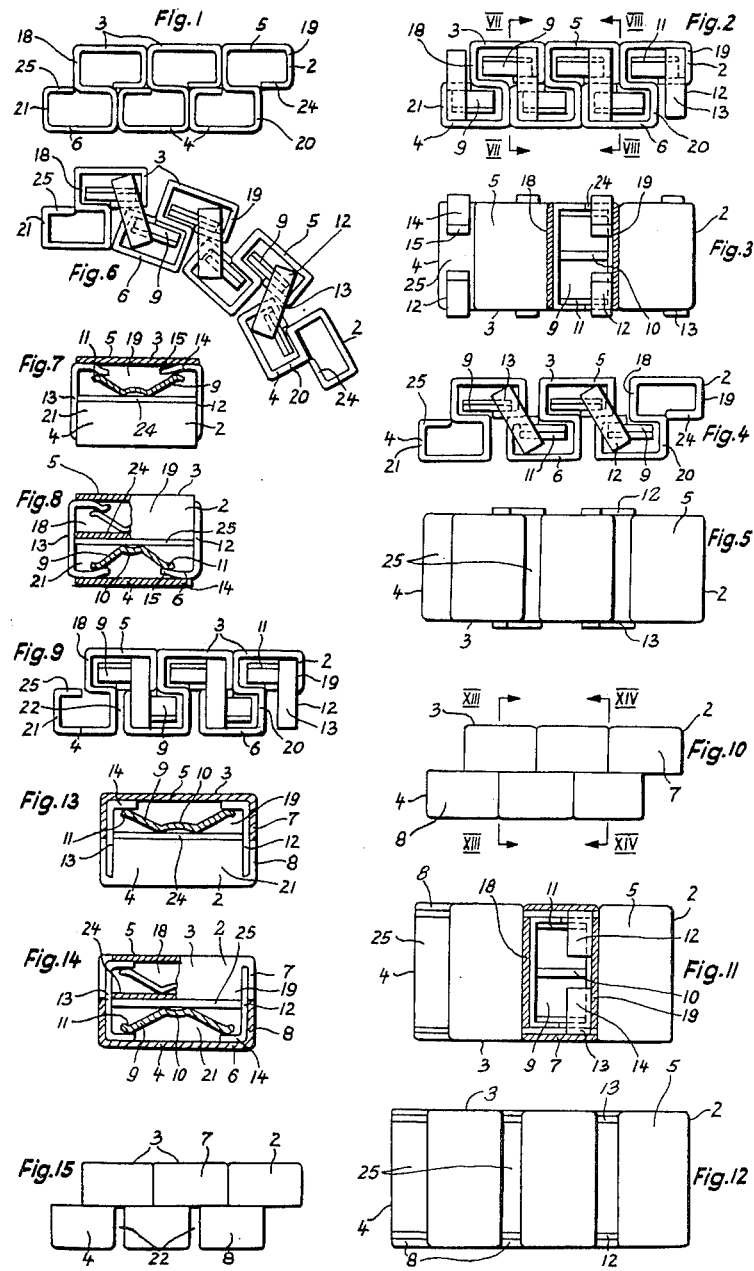
INVENTOR.
Ludwig Kunzmann
BY Michael S. Striker Dec. 4, 1962  L. KUNZMANN  3,066,475
ELASTIC LINK STRAPS
Filed Nov. 15, 1956  4 Sheets-Sheet 2
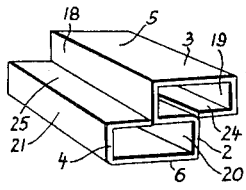
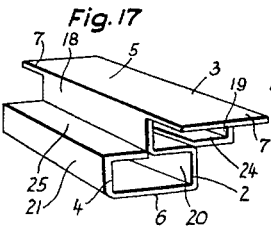
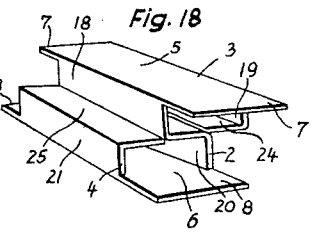
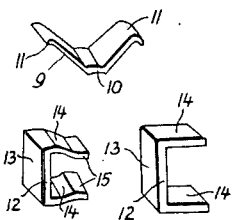
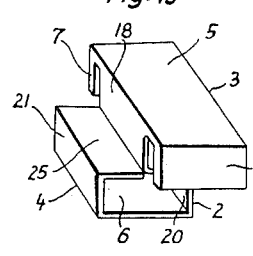
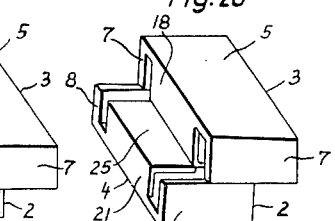
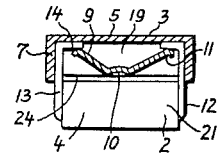
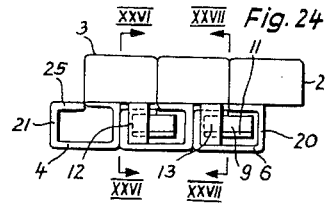
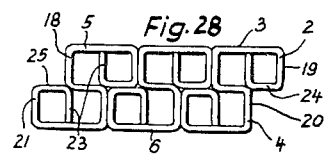
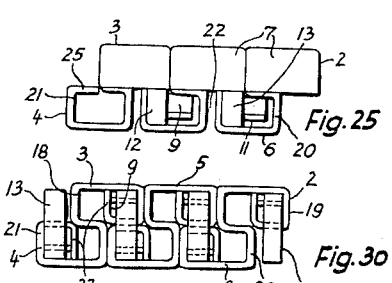
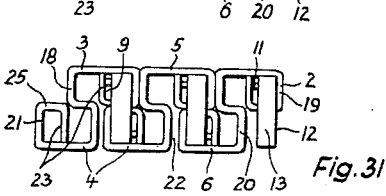
INVENTOR.
Ludwig Kunzmann
BY Michael S. Striker

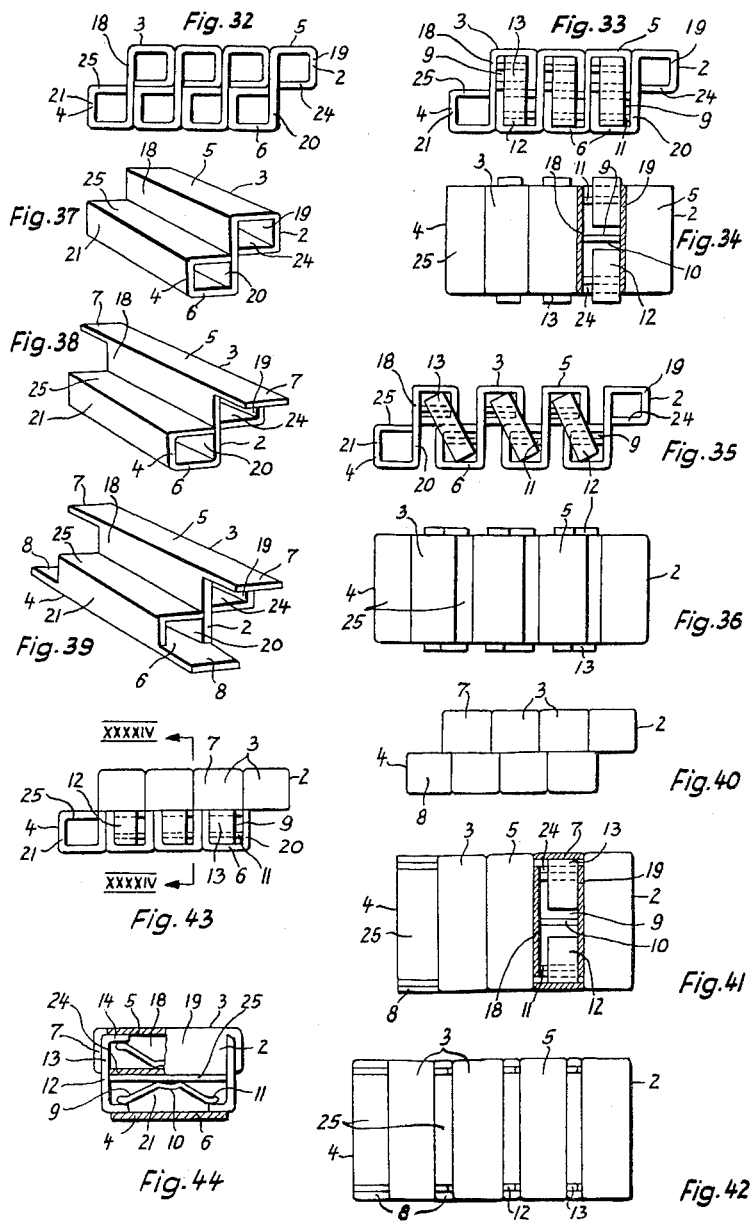

Dec. 4, 1962 L. KUNZMANN 3,066,475
ELASTIC LINK STRAPS
Filed Nov. 15, 1956 4 Sheets-Sheet 4
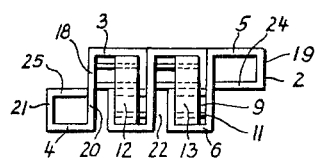
Fig. 45
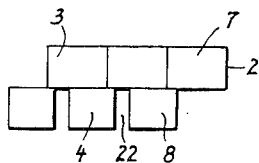
Fig. 46
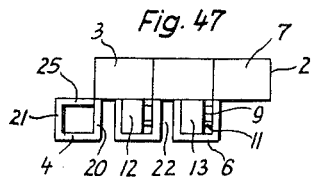
Fig. 47
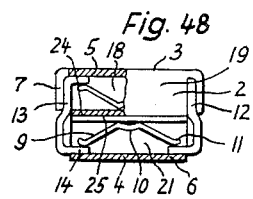
Fig. 48
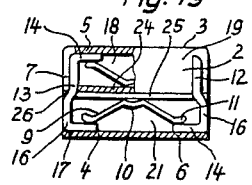
Fig. 49
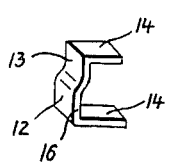
Fig. 50
Fig. 51
Fig. 52
INVENTOR.
Ludwig Kunzmann
BY Michael S. Striker
agt.

United States Patent Office 3,066,475
Patented Dec. 4, 1962

3,066,475
ELASTIC LINK STRAPS
Ludwig Kunzmann, Pforzheim, Germany, assignor to Rodi & Wienenberger Aktiengesellschaft, Pforzheim, Germany
Filed Nov. 15, 1956, Ser. No. 622,429
Claims priority, application Germany Oct. 11, 1956
13 Claims. (Cl. 59—79)

The present invention relates to improvements in elastic link straps for ornamental or utilitarian purposes, and especially in watch bracelets, of the type consisting of a plurality of hollow links and connecting members which are pivotable against spring action and connect these links to each other so as to be flexible as well as expansible relative to each other. The hollow links of this type of link straps are formed of two layers of cylindrical casings, while the connecting members are formed of substantially U-shaped brackets which are disposed along the longitudinal sides of the strap and one arm of which is inserted into each open end of one casing of one layer and the other arm into each open end of the adjacent casing of the other layer.

The elastic link straps of this type such as were known prior to this invention consisted of two superimposed layers of such hollow links or link casings which were staggered relative to each other and connected with each other intermediate the two layers merely by the connecting brackets so that the corresponding arms of two adjacent brackets then engaged at each side of the strap into the open end of each casing of both layers. Such two-layer link straps have the disadvantage that it is very difficult to assemble and connect the individual parts thereof since it is necessary first to arrange the individual link casings adjacent to each other in a row, as well as above each other in two layers which are properly staggered relative to each other, and then to connect the adjacent links of one layer with those of the other layer.

It is the principal object of the present invention to overcome this disadvantage of the two-layer link straps as previously designed, and to simplify the construction and facilitate the assembly of the link strap considerably, and thus to reduce the cost of manufacture thereof.

Another object of the present invention consists in materially reducing the number of parts necessary to make up the new elastic link strap.

The present invention provides a link strap wherein there are double links each constructed of a single strip of rigid sheet metal bent to form staggered link casings and having ends abutting on outer surfaces of the link casings, and having at least a portion of one wall of one casing coplanar with at least a portion of one wall of the other casing of the same double link.

The basic feature of the invention for attaining the above-mentioned objects consists in rigidly securing each casing of one layer of the strap with one casing of the other layer so that these casings then form the upper and lower parts of a single double-link. Due to such construction, only one-half of the number of connecting brackets as previously required in a double-layer strap will now be needed to connect the adjacent links to each other, since only one arm of a single connecting bracket is inserted into each open end of the superimposed upper and lower parts of two adjacent double-links. When assembling the link strap, it will thus no longer be necessary to arrange the individual link casings of the two layers both properly above as well as adjacent to each other and in the required staggered relation to each other, but it will now suffice if the finished double-links are simply placed adjacent to each other so as to form a row of double-links, the two layers of which are automatically staggered in the proper relation to each other.

The double-links according to the invention may be simply formed by soldering one link of each layer to each other in the proper staggered relationship. A preferred feature of the invention, however, consists in making each double-link of a single stamped-out piece of sheet material, and preferably sheet metal, which is bent into a cross-sectional shape resembling the number 8 in an oblique position.

Each hollow part or casing of such double-link is provided at the inside thereof with an angularly bent leaf spring, the outer or convex side of which engages with that wall of the casing which rests upon the adjacent casing of the other layer. The outer ends of this angular leaf spring are preferably slightly bent over or beveled in the opposite direction and engage with the arms of the connecting brackets which extend into the casings, so that each leaf spring will then resiliently oppose a pivotal movement of these connecting brackets relative to the casings or double-links when the strap is being expanded or bent.

The upper and lower casings forming one double-link may be made of greater width and, for example, approximately twice as wide as the back portion of the connecting brackets, so that the two casings of each double-link are at least partly superimposed upon each other when the strap is in the contracted position. Thus, if the two interconnected casings of each double-link are staggered relative to each other, for example, by the width of one-half casing, the projecting portions of the common wall connecting the two links or the inwardly bent end portion of each casing of one layer which extends laterally beyond the side wall of the casing of the other layer, also extends beyond these back portions of the connecting brackets and serves as a supporting surface for the projecting portion of the opposite casing of each adjacent double-link. Thus, by rigidly securing the two casings of one pair to each other or by making them of one piece of material, one of the two pairs of connecting brackets as required in each pair of casings of the two-layer link straps of prior design will become unnecessary.

The length and width of the leaf springs which are preferably inserted into each casing of the double-links substantially corresponds to the inner length and width of the casings. However, since the back portions of the connecting brackets are only approximately half as wide as the links, this means that when the strap is looked upon the narrow longitudinal side thereof, it will have a somewhat uneven appearance.

It is a further object of the present invention to avoid this disadvantage of the previously described embodiment. For this purpose, the two ends of the sheet-metal pieces which are bent substantially into the shape of a number 8 to form one double-link are bent over inwardly so as to form partitions which divide each casing in half. The leaf springs which extend within the links transversely to the longitudinal direction of the strap are made in such event of a width substantially corresponding to the width of the back portions of the connecting brackets.

According to another embodiment of the invention, the last-mentioned object may also be achieved by designing the individual double-links of the strap so that the two interconnected casings thereof are staggered relative to each other by the width of one entire casing. The inner width of each casing is then made only substantially equal to the width of the back portions of the connecting brackets and the entire extent of the inner wall of the two interconnected casings of one double-link facing toward the other layer then serves as a supporting surface for the opposing wall of the two adjacent double-links. However, unless the back portions of the connecting brackets are made wider than the arms thereon which extend into the casings, it is to be understood that the two casings of each double-link have to be of a width greater by approximately twice the thickness of their walls than the connecting brackets which are inserted therein. In this last-described embodiment of the invention, one vertical side wall of each casing is continuous and in the same plane with one side wall of the casing of the other layer.

As usual in elastic straps of this type, the arms of the connecting brackets fitting with a small amount of play within the casings are of greater width than height. They may furthermore be provided at their inner sides with a transverse groove or a bent portion into or behind which the bent-over ends of the leaf springs engage within the casings so as to prevent the connecting brackets from slipping out of the open ends of the casings.

The upper sides of the double-links forming the ornamental side of the strap and/or the lower, arm-engaging sides thereof may also be provided with extensions at their outer ends which, after the connecting brackets are inserted into the open ends of the casings, are bent downwardly or upwardly, respectively, so as to form tabs which cover up the sides of the strap either partly or entirely and at the same time prevent the connecting brackets from falling out of the open ends of the casings. This last-mentioned feature may be provided either in place of or in addition to the bracket-securing feature as previously mentioned. Since the narrow longitudinal sides of the strap will thus be covered either partly or entirely, the strap when contracted, will have a closed uniform appearance.

If the narrow sides of only one layer of the strap and thus only one-half of the back portion of each connecting bracket are covered by the tablike extensions, a further embodiment of the present inveniton provides the uncovered back portions of the connecting brackets as being bent outwardly relative to the covered portions. These outwardly bent parts of the back portions of the connecting brackets will then lie in substantially the same vertical plane as the bent-over tabs of the casings of the other layer. The side walls, as well as the outer wall of the open or uncovered casings are then preferably also extended at each end by the thickness of the material of the brackets so as to be within the same plane as the outer surface of the outwardly bent parts of the back portions of the brackets.

A further preferred modification of the invention consists in making the upper casings of the double-links wider than the lower casings, as seen in the longiudinal direction of the strap. When the strap is then in the fully contracted position, the side walls of the adjacent upper casings will engage with each other, while the lower casings will be separated by gaps which will prevent the skin or hairs on the hand and wrist of the wearer from being caught between the lower edges and side walls of the lower casings.

The individual parts of the link strap according to any of the embodiments of the present invention as above described may be made of nonprecious or precious metals or alloys thereof. If desired, most of the parts may also be made of synthetic materials.

Furthermore, the various features of the different embodiments of the invention may also be exchanged for one another which will result in many other modifications which have not been described in detail, and anyone or more of the novel features as described when applied to an elastic link strap are regarded as falling within the concept of this invention.

Further objects, features, and advantages of the present invention will be apparent from the following detailed description thereof which is to be read with reference to the accompanying drawings illustrating several different embodiments of the invention diagrammatically and on an enlarged scale, wherein FIG. 1 shows an end view of several double-links according to a first embodiment of the invention placed in a row adjacent to each other;

FIG. 2 shows the same view of the double-links in the fully assembled condition;

FIG. 3 shows a plan view, partly in cross section of the same double-links;

FIG. 4 shows a view similar to FIG. 2, but with the double-links in the expanded position;

FIG. 5 shows a plan view to FIG. 4;

FIG. 6 shows an end view similar to FIG. 4, but with the strap in a bent position;

FIG. 7 shows a cross section taken along line VII—VII of FIG. 2;

FIG. 8 shows a cross section taken along line VIII—VIII of FIG. 2;

FIG. 9 shows a view similar to FIG. 2, in which, however, the lower casings of the double-links are of narrower width than the upper casings;

FIG. 10 shows an end view of the double links of a link strap in which the open ends of the casings of both layers are completely covered;

FIG. 11 shows a plan view, partly in section, of a link strap according to FIG. 10;

FIG. 12 shows a plan view of a strap according to FIGS. 10 and 11 in the expanded position;

FIG. 13 shows a cross section taken along line XIII—XIII of FIG. 10;

FIG. 14 shows a cross section taken along line XIV—XIV of FIG. 10;

FIG. 15 shows a view similar to FIG. 10, in which, however, the lower casings of the double-links, the open ends of which are completely covered, are of narrower width than the upper casings;

FIG. 16 shows a perspective view of a single double-link of a strap according to FIGS. 1 to 8;

FIG. 17 shows a perspective view of a double-link with extensions projecting from the ends of the upper side thereof;

FIG. 18 shows a similar view of a double-link with extensions on the ends of both the upper and lower sides thereof;

FIG. 19 shows a perspective view of a double-link according to FIG. 17 with the extensions bent over downwardly so as to cover the open ends of the upper casing;

FIG. 20 shows a similar view of a double-link according to FIG. 18 with the extensions bent over toward each other so as to cover the open ends of both casings of the double-link;

FIG. 21 shows a perspective view of one of the leaf springs;

FIG. 22 shows a perspective view of one embodiment of a connecting bracket according to the invention;

FIG. 23 shows a similar view of another embodiment of a connecting bracket;

FIG. 24 shows an end view of a part of a link strap with double-links according to FIGS. 17 and 19, in which only the open ends of the upper layer of casings are covered;

FIG. 25 shows an end view similar to FIG. 24, in which, however, the lower casings are of narrower width than the upper casings;

FIG. 26 shows a cross section taken along line XXVI—XXVI of FIG. 24;

FIG. 27 shows a cross section taken along line XXVII—XXVII of FIG. 24;

FIG. 28 shows an end view of a modification of the double-links according to another embodiment of the invention placed in a row adjacent to each other, wherein the free ends of the stamped sheet metal pieces forming the links are extended and bent over inwardly so as to form partitions dividing each upper and lower casing in half;

FIG. 29 shows a perspective view of an individual double-link according to FIG. 28;

FIG. 30 shows a view similar to FIG. 28, but with the double-links in the fully assembled condition;

FIG. 31 shows a view similar to FIG. 30, in which, however, the lower casings are narrower than the upper casings;

FIG. 32 shows an end view of a further modification of the double-links according to the invention placed in a row adjacent each other, wherein the casings of the two layers are staggered relative to each other to the extent of the full width of one casing;

FIG. 33 shows a view similar to FIG. 32, but with the double-links in the fully assembled condition;

FIG. 34 shows a plan view, partly in section, of FIG. 33;

FIG. 35 shows an end view similar to FIG. 33, but with the links in the expanded position;

FIG. 36 shows a plan view of FIG. 35;

FIG. 37 shows a perspective view of an individual double-link according to FIGS. 32 to 36;

FIG. 38 shows a similar view of a double-link in which, however, the ends of the upper side of the upper casing are provided with extensions;

FIG. 39 shows a similar view of a double-link in which the ends of both the upper and lower sides of the link are provided with extensions;

FIG. 40 shows an end view of a part of a link strap composed of double-links according to FIG. 39;

FIG. 41 shows a plan view, partly in section of FIG. 40;

FIG. 42 shows a plan view of FIG. 40, but with the links in the expanded position;

FIG. 43 shows an end view of a strap composed of double-links according to FIG. 38;

FIG. 44 shows a cross section taken along line XXXXIV—XXXXIV of FIG. 43;

FIG. 45 shows an end view similar to FIG. 33 in which, however, the lower casings of the double-links are narrower than the upper casings;

FIG. 46 shows a view similar to FIG. 40 of the modification according to FIG. 45;

FIG. 47 shows a view similar to FIG. 43 of the modification according to FIG. 45;

FIG. 48 shows a cross section through a double-link according to a further modification of the invention, in which the open ends of the casings of one layer are covered by tablike extensions thereof and the back portions of the connecting brackets are bent outwardly so as to be in the same vertical plane as the tabs of the casings of the first layer;

FIG. 49 shows a view similar to FIG. 48, in which, however, the lower or arm-engaging side is lengthened so that its outer edges are within the same vertical plane as the outer surfaces of the outwardly bent portions of the connecting brackets.

FIG. 50 shows an individual connecting bracket according to FIGS. 48 and 49;

FIG. 51 shows a perspective view of a double-link according to FIG. 49; while

FIG. 52 shows a similar view as FIG. 51, but in which a pair of connecting brackets of the type as shown in FIG. 50 are inserted into the lower casing.

Referring to the drawings in which the same reference numerals are used to indicate similar parts of the various embodiments of the invention, each of the hollow double-links 2 is preferably made of a single piece of sheet metal or a suitable synthetic material which is bent so as to form two interconnected, substantially rectangular casings 3 and 4 which are disposed in two different planes and are staggered relative to each other. In most of the embodiments of the invention, as shown in FIGS. 1 to 31, the two casings of each double-link are staggered relative to each other by the width of one-half casing. For this purpose, one-half of an elongated strip of sheet material is bent to form, for example, the lower casing 4 so that the free end portion of this strip forms one-half of the upper wall or lid 25 of the lower casing 4, while the other half of such lid at the same time forms one-half of the bottom 24 of the upper casing 3. The other half of the strip of material is then bent upwardly from the central point of engagement of the two lid portions 25 of the lower casing 4 so as first to form one vertical side wall 18 of the upper casing 3. The other end portion of the strip which is finally bent inwardly from the other side wall 19 of the upper casing then forms the other half of the bottom 24 of the upper casing 3. The two inwardly bent end portions of the strip forming one-half of lid 25 of the lower casing 4 and one-half of the bottom 24 of the upper casing 3 then form the supporting surfaces which engage with the opposing surfaces of the two adjacent double-links 2 and slide along the same when the strap is being expanded or contracted. It is to be understood that the foregoing description is merely intended to define the shape of the double-links and their relation to each other, and that it is not intended to limit the particular manner of constructing the double-links as this may obviously be done in various ways.

The adjacent double-links are connected with each other by a pair of connecting brackets 12, each having a back portion 13 and a pair of arms 14 thereon extending substantially at a right angle thereto. A distinguishing feature of the present invention consists in the fact that the back portions 13 of all the connecting brackets 12 at each side of the strap extend parallel to each other in the released as well as in the expanded position of the strap. This is due to the fact that, since the upper and lower casings 3 and 4 of each double-link 2 are rigidly connected, each upper casing 3 of one double-link only needs to be pivotally connected with one lower casing 4 of one adjacent double-link by means of a single pair of connecting brackets 12, arms 14 of which are inserted for this purpose into the open ends of casings 3 and 4.

Each casing 3 and 4 of the strap has a leaf spring 9 inserted therein. These leaf springs are bent at an angle and the central apex 10 thereof is preferably flattened or inwardly curved so as to seat the spring more securely. This flattened or curved central portion 10 engages with the respective inner wall of the casing, that is, with the lower wall 24 of the upper casing 3 or the upper wall 25 of the lower casing 4, respectively, while the outer ends of each spring 9 engage with the corresponding arms 14 of one pair of connecting brackets 12. In order to permit the two arms of springs 9 to slide more easily along the inner surfaces of bracket arms 14 when the strap is being expanded or released and connecting brackets 12 are pivoted, the outer ends 11 of the springs are slightly beveled or bent backwardly so that the actual edge or surface thereof engaging bracket arms 14 will be smooth. If the ends of casings 3 and 4 are left open, as shown in FIGS. 1 to 8, it will be necessary to provide suitable means for preventing the connecting brackets from slipping out of these open ends and for insuring that the adjacent double-links 2 will not unintentionally be separated. For this purpose, the free ends 15 of bracket arms 14 are bent slightly inwardly so as to act as stops which reach behind the spring ends 11 and in resilient locking engagement therewith. In order to separate two adjacent double-links 2, it is therefore necessary to pull brackets 12 out of the open ends of casings 3 and 4 against the action of springs 9.

For assembling a link strap as shown in the first embodiment according to FIGS. 1 to 8, it is merely necessary to pile the individual double-links 2 on each other so as to form a row, as shown in FIG. 1, then to insert one leaf spring 9 in each casing 3 and 4, and finally to attach the connecting brackets 12 to each side of the double links and to snap bracket arms 14 into locking engagement with spring ends 11.

For preventing the skin or hairs on the hand and wrist of the wearer from being caught between side walls 20 and 21 of the adjacent lower casings 4, it is advisable as shown, for example, in FIG. 9, to make these lower casings of a slightly narrower width than the upper casings 3. When the strap is then in the fully released position, side walls 18 and 19 of the upper casings 3 of adjacent double-links 2 will engage with each other, while gaps 22 will remain between side walls 20 and 21 of the lower casings 4.

Since, as shown, for example, in FIG. 2, the back portions 13 of connecting brackets 12 are of a width slightly less than one-half of the inner width of casings 3 and 4, the narrow longitudinal sides of such a strap are rather irregular and produce an uneven, unpleasant appearance. This may be prevented according to the invention either partly or entirely by providing either one or both of the upper walls 5 of the upper casing 3 and the bottom wall 6 of the lower casing 4 with outer extensions 7 or 8 of a length substantially equal to the height of one casing. After the double-links 2 are piled in a row adjacent to each other and the leaf springs 9 and connecting brackets 12 are inserted into the open ends of each casing 3 and 4, these outer extensions 7 or 8 are bent either downwardly or upwardly so as to form tabs or end walls which cover the open ends of the respective casing. Thus, if only one layer of casings, for example, the upper layer, is provided with such bent-over tabs 7, the open ends of such layer, as well as one-half of the height of the back portions 13 of brackets 12 will be covered so that, for example, the upper half of the side edges of the strap which is especially noticeable will be covered, as shown, for instance, in FIG. 24. If both layers of casings 3 and 4 are provided with such bent-over tabs 7 and 8, the open ends of the casings and the entire back portions 13 of brackets 12 will be completely covered and the side edges of the strap will present an entirely closed uniform appearance as shown, for instance, in FIG. 10.

The bent-over tabs 7 or 8, even if provided on only one layer of casings, will also serve as means for preventing arms 14 of connecting brackets 12 from slipping out of engagement with the ends of leaf springs 9 and from falling out of the casings of either layer. Connecting brackets 12 may then be either of the shape as previously described and shown particularly in FIG. 22 or of a plain rectangular shape as shown in FIG. 23. Although the inwardly bent ends 15 on the bracket arms 14 will then not be required to prevent the brackets from slipping out of the casings, they may be desirable to maintain springs 9 in their proper central position within the casings.

According to a further embodiment of the invention, as shown in FIGS. 32 to 47, the upper and lower casings 3 and 4 of each double-link 2 are staggered relative to each other by the width of one entire casing so that side wall 18 of the upper casing 3 is continuous and in the same vertical plane with side wall 20 of the lower casing 4. Each individual casing, as well as the leaf spring 9 therein, then also needs to be only of a width slightly larger than that of bracket arms 14, that is, of a width which will permit these bracket arms to pivot freely within each casing when the strap is being expanded, as shown in FIG. 35. The casings may again either be left open at their ends, as shown in FIGS. 32 to 37, in which event the connecting brackets should be of the type as shown in FIG. 22, or the casings of one layer, for example, the upper layer, may have tablike extensions 7 which, after the springs 9 and the arms of connecting brackets 12 are inserted into the casings, are bent over to cover the open ends of these casings, as well as one-half of the back portion 13 of each connecting bracket 12, as shown in FIGS. 38, 43, and 44, or the casings of both layers may be covered with similar tabs 7 and 8 to cover the open ends thereof, as well as the entire back portions 13 of the connecting brackets 12, as shown in FIGS. 39 to 42. Depending upon whether one or both layers are thus covered, the side edges of the strap, particularly when the latter is contracted, will then have either a partly or fully closed appearance, and the simple rectangular type of connecting brackets as shown in FIG. 23 may be used as they will be retained in place on the casings by the overlapping tabs 7 or 8. As shown in FIGS. 45 to 47, the lower casings 4 may also be of narrower width than the upper casings 3 so as to be separated by gaps 22 which will prevent the skin or hairs on the hand or wrist of the wearer from being caught between the side walls 20 and 21 of adjacent casings.

FIGS. 48 to 52 finally show a modification of the invention in which only the upper casings 3 of double-links 2 are covered by bent-over tabs 7. In order to give the side edges of the strap a more uniform and closed appearance, especially when the strap is in the contracted position, the lower half 16 of the back portion 13 of each connecting bracket 12 is bent outwardly so that this portion 16 which is not covered by bent-over tabs will be within the same vertical plane as tabs 7 on the outer ends of the upper casings 3. In addition, the bottom and side walls 6, 20, and 21 of the lower casings 4 may be extended at each end beyond the length of the side and bottom walls 18, 19, and 24 of the upper casing 3 by the thickness of back portion 13 of the brackets, while edges 26 of the upper wall 25 of the lower casing 4 may be recessed accordingly from the outer edges of walls 20 and 21. The cutouts thus formed are adapted to receive the outwardly bent portion 16 of brackets 12, so that the outer surface thereof will also be within the same plane as the outer edges of walls 6, 20, and 21 and will not project outwardly therefrom. Although in FIGS. 48 to 52 this modification of the invention has been shown as applied to double-links of the fully staggered type, as shown in FIGS. 32 to 47, it is to be understood that it may be similarly applied to the embodiments as first described in which the upper and lower casings are only staggered relative to each other by the width of one-half casing, as shown, for example, in FIGS. 17 and 19. The lower casings 4 may then, for example, be made of a length corresponding to that of the upper casings 3 including the bent-over tabs 7, and the cutouts 26 may then be provided in only that part, or in that compartment according to FIGS. 28 to 31, which is outwardly substantially covered by the back portions 13 of brackets 12 so that the outer surface of the outwardly bent portions 16 of the brackets will be within the same plane as the outer edges of the bottom and side walls of the lower casing 4 as well as the outer surface of tabs 7 of the upper casing 3.

While the invention has been described in detail with reference to certain now preferred examples and embodiments thereof, it will be understood by those skilled in the art that various changes and modifications may be made without departing from the spirit and scope of the invention as defined in the appended claims.

The invention having thus been described, what is claimed as new is:

1. An elastic link strap comprising a set of rigid double links, each double link including two integrally connected sleeve-shaped link casings staggered in longitudinal direction of the link strap and in direction of the thickness of the link strap, each double link consisting of a single strip of rigid sheet metal bent to form said link casings thereof and having ends abutting on outer surfaces of said link casings, said double links being arranged adjacent each other in overlapping relationship so that said link casings form two superimposed layers, at least a portion of one wall of one casing being coplanar with at least a portion of one wall of the other casing of the same double link, and slidably engaging opposing wall portions of adjacent double links, each casing in one layer being slidable on a casing in the other layer; a set of pairs of substantially U-shaped connecting members, each pair of connecting members being associated with two double links, the connecting members of each pair being located opposite each other at the longitudinal sides of the strap, each connecting member having a back portion and a pair of arms thereon, one of said arms of each connecting member being located and turnable in a casing of one double link located in one of said layers, and the other arm being located and turnable in a casing of an adjacent double link located in the other of said layers, the number of pairs of said connecting members being half the number of said casings, and each casing having only two arms of one pair of connecting members turnably mounted therein; and spring means located within each casing operatively connected to the respective casing and on the respective arms of said connecting members to resist turning of the same.

2. A link strap as set forth in claim 1 wherein said casings of each double link have rectangular cross-section, and wherein said portion of one wall of one casing which also forms a portion of one wall of the other casing extends for substantially half the width of the respective casings in longitudinal direction of the link strap.

3. An elastic link strap comprising a set of rigid double links, each double link including two integrally connected sleeve-shaped link casings staggered in longitudinal direction of the link strap and in direction of the thickness of the link strap, each double link consisting of a single strip of rigid sheet metal bent to form said link casings thereof and having ends abutting on outer surfaces of said link casings, said double links being arranged adjacent each other in overlapping relationship so that said link casings form two superimposed layers, a portion of one wall of one casing also forming a portion of one wall of the other casing of the same double link, the other portions of said walls projecting in longitudinal direction of said link strap beyond the other casing of the respective double link, and slidably engaging corresponding wall portions of adjacent double links, each casing in one layer being slidable on a casing in the other layer; a set of pairs of substantially U-shaped connecting members, each pair of connecting members being associated with two double links, the connecting members of each pair being located opposite each other at the longitudinal sides of the strap, each connecting member having a back portion and a pair of arms thereon, one of said arms of each connecting member being located and turnable in a casing of one double link located in one of said layers, and the other arm being located and turnable in a casing of an adjacent double link located in the other of said layers, the number of pairs of said connecting members being half the number of said casings, and each casing having only two arms of one pair of connecting members turnably mounted therein; and spring means located within each casing operatively connected to the respective casing and on the respective arms of said connecting members to resist turning of the same.

4. An elastic link strap as defined in claim 3, wherein the outer ends of the outer wall of one casing of each of said double links have extensions thereon, said extensions being bent over toward the casing of the other layer of the adjacent double link after said leaf spring and the corresponding arms of one pair of connecting brackets have been inserted therein so as to cover the open ends of said casing, as well as substantially one-half of the back portion of each connecting bracket for preventing both arms of each of said connecting brackets from disengaging from said spring in said casing and from the spring in the casing of the opposite layer of the adjacent double link, and for preventing said bracket arms from slipping out of the open ends of said casings, substantially the other half of said back portion of each connecting bracket which is not covered by said bent-over extension being bent so as to project outwardly so that the outer surface thereof is substantially within the same plane as the outer surface of said bent-over extension.

5. An elastic link strap as defined in claim 4, wherein the outer wall and the side walls of that casing of each double link, the ends of which are not covered, are of a length susbtantially equal to the length of the other casing including its bent-over extensions, so that the outer edges of said side walls are disposed substantially within the same plane as the outer surface of the projecting part of said back portion of each of said connecting brackets.

6. A link strap as set forth in claim 3, wherein each of said spring means is a leaf spring of angular shape having a center portion engaging the inside of one wall of the respective sleeve-shaped portion, and having two inclined end portions projecting toward the open ends of the respective sleeve-shaped portion; and wherein one pair of arms of each pair of connecting members are engaged by said end portions of the respective leaf spring.

7. A link strap as set forth in claim 6, wherein said arms of said connecting members are inwardly inclined so that the connecting members of each pair of connecting members are held by said end portions of the respective leaf springs.

8. An elastic link strap as defined in claim 6, wherein the two free ends of the material forming said double-link are extended and each extension is bent-over at a right angle inwardly into each casing so as to form a partition dividing each casing substantially in half, said leaf spring, as well as the two corresponding arms of one opposite pair of connecting brackets being disposed within each projecting half of each casing limited by said partition and one side wall of said casing, said spring being of angular shape and extending substantially transverse to the longitudinal direction of said strap, the apex portion of said spring engaging with the inner surface of said projecting wall portion, the two outer ends of said spring within said projecting half of each casing engaging with and acting upon said corresponding arms of said pair of brackets so as resiliently to oppose a pivotal movement of said brackets relative to said casings when said strap is being expanded or bent, the width of said leaf spring and said back portion of said brackets substantially corresponding to the inner width of said projecting half of each casing.

9. An elastic link strap comprising a set of rigid double links, each double link including two integrally connected link casings staggered in longitudinal direction of the link strap and in direction of the thickness of the link strap, each double link consisting of a single strip of rigid sheet metal bent to form said link casings thereof and having ends abutting on outer surfaces of said link casings, said double links being arranged adjacent each other in overlapping relationship so that said link casings form two superimposed layers, each casing in one layer being slidable on a casing in the other layer, each of said casings including a sleeve-shaped portion having open ends, at least one casing of each double link having a pair of end walls covering said open ends of said sleeve portion thereof and being spaced from the same; a set of pairs of substantially U-shaped connecting members, each pair of connecting members being associated with two double links, the connecting members of each pair being located opposite each other at the longitudinal sides of the strap, each connecting member having a back portion and a pair of arms thereon, one of said arms of each connecting member being located and turnable in a casing of one double link located in one of said layers, and the other arm being located and turnable in a casing of an adjacent double link located in the other of said layers, the number of pairs of said connecting members being half the number of said casings, and each casing having only two arms of one pair of connecting members turnably mounted therein, at least a part of said back portion being located between the respective open end of the respective sleeve-shaped portion and the respective end wall whereby said connecting members are retained in said casings; and spring means located within each casing operatively connected to the respective casing and on the respective arms of said connecting members to resist turning of the same, the two casings of each double link being staggered by substantially the full width of one casing relative to each other so that one side wall at one side of one casing is continuous with and in the same plane as the side wall at the other side of the other casing of the same double link, each of said casings being of a width substantially equal to the width of said back portion of said connecting members, one entire wall of each casing of each double link being substantially in engagement with and supporting the opposing wall of a casing of the other layer of each adjacent double link when said strap is in the contracted position and being adapted to slide along said wall when said strap is being expanded.

10. An elastic link strap comprising a set of rigid double links, each double link including two integrally connected sleeve-shaped link casings staggered in longitudinal direction of the link strap and in direction of the thickness of the link strap, each double link consisting of a single strip of rigid sheet metal bent to form said link casings thereof and having ends abutting on outer surfaces of said link casings, said double links being arranged adjacent each other in overlapping relationship so that said link casings form two superimposed layers, a portion of one wall of one casing also forming a portion of one wall of the other casing of the same double link, the other portions of said walls projecting in longitudinal direction of said link strap beyond the other casing of the respective double link, and slidably engaging opposing wall portions of adjacent double links, each casing in one layer being slidable on a casing in the other layer, each of said casings including a sleeve-shaped portion having open ends, at least one casing of each double link having a pair of end walls covering said open ends of said sleeve portion thereof and being spaced from the same, the sleeve-shaped portions of the casings located in one of said layers being narrower in longitudinal direction of the link strap than the sleeve-shaped portions of the casings in the other layer so that said casings in said one layer are spaced from each other when the casings in the other layer abut each other; a set of pairs of substantially U-shaped connecting members, each pair of connecting members being associated with two double links, the connecting members of each pair being located opposite each other at the longitudinal sides of the strap, each connecting member having a back portion and a pair of arms thereon, one of said arms of each connecting member being located and turnable in a casing of one double link located in one of said layers, and the other arm being located and turnable in a casing of an adjacent double link located in the other of said layers, the number of pairs of said connecting members being half the number of said casings, and each casing having only two arms of one pair of connecting members turnably mounted therein, at least a part of said back portion being located between the respective open end of the respective sleeve-shaped portion and the respective end wall whereby said connecting members are retained in said casings; and spring means located within each casing operatively connected to the respective casing and on the respective arms of said connecting members to resist turning of the same.

11. A link strap as set forth in claim 10, wherein said sleeve-shaped portions have rectangular cross-section, and wherein the portion of one wall of one sleeve-shaped portion which also forms a portion of one wall of the other sleeve-shaped portion of the same double link extends for substantially half the width of the respective casings in longitudinal direction of the link strap.

12. An elastic link strap comprising a set of rigid double links, each double link including two integrally connected link casings of prismatic shape and rectangular cross-section staggered in longitudinal direction of the link strap and in direction of the thickness of the link strap, each double link consisting of a single strip of rigid sheet metal bent to form said link casings thereof and having ends abutting on outer surfaces of said link casings, said double links being arranged adjacent each other in overlapping relationship so that said link casings form two superimposed layers, a portion of one wall of one casing also forming a portion of one wall of the other casing of the same double link, the other portions of said walls projecting in longitudinal direction of said link strap beyond the other casing of the respective double link, and slidably engaging opposing wall portions of adjacent double links, each casing in one layer being slidable on a casing in the other layer, each of said casings including a sleeve-shaped portion having open ends, each casing of each double link having a pair of end walls covering said open ends of said sleeve portion thereof and being spaced from the same; a set of pairs of substantially U-shaped connecting members, each pair of connecting members being associated with two double links, the connecting members of each pair being located opposite each other at the longitudinal sides of the strap, each connecting member having a back portion and a pair of arms thereon, one of said arms of each connecting member being located and turnable in a casing of one double link located in one of said layers, and the other arm being located and turnable in a casing of an adjacent double link located in the other of said layers, the numbers of pairs of said connecting members being half the number of said casings, and each casing having only two arms of one pair of connecting members turnably mounted therein, said back portion being located between the respective open ends of the respective sleeve-shaped portions and the respective end walls whereby said connecting members are retained in said casings; and an angular, leaf spring located within each casing and having a center portion engaging the respective casing, and end portions engaging the respective arms of said connecting members to resist turning of the same.

13. A link strap as set forth in claim 12, wherein each double link includes a wall having one portion forming one side wall of one casing, and another portion forming one side wall of the other casing of the respective double link so that the casings of each double link are fully staggered.

References Cited in the file of this patent

UNITED STATES PATENTS

| | | |
|---|---|---|
| 1,089,931 | Looq | Mar. 10, 1914 |
| 1,796,355 | Augenstein | Mar. 17, 1931 |
| 2,689,450 | Stiegele | Sept. 21, 1954 |
| 2,799,135 | Dolansky | July 16, 1957 |
| 2,957,303 | Sasaki | Oct. 25, 1960 |

FOREIGN PATENTS

| | | |
|---|---|---|
| 421,157 | France | Feb. 16, 1911 |
| R17,099 | Germany | June 24, 1956 |
| 527,990 | Canada | July 17, 1956 |